Feb. 14, 1928.
F. NIELSEN
SHOCK ABSORBER
Filed Dec. 24, 1925
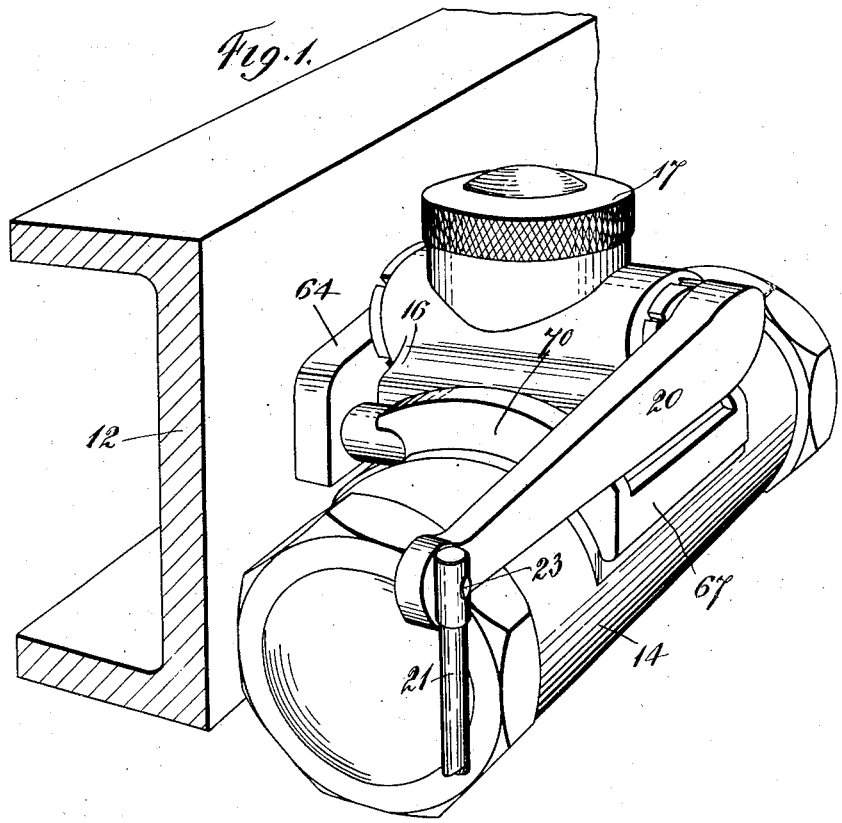
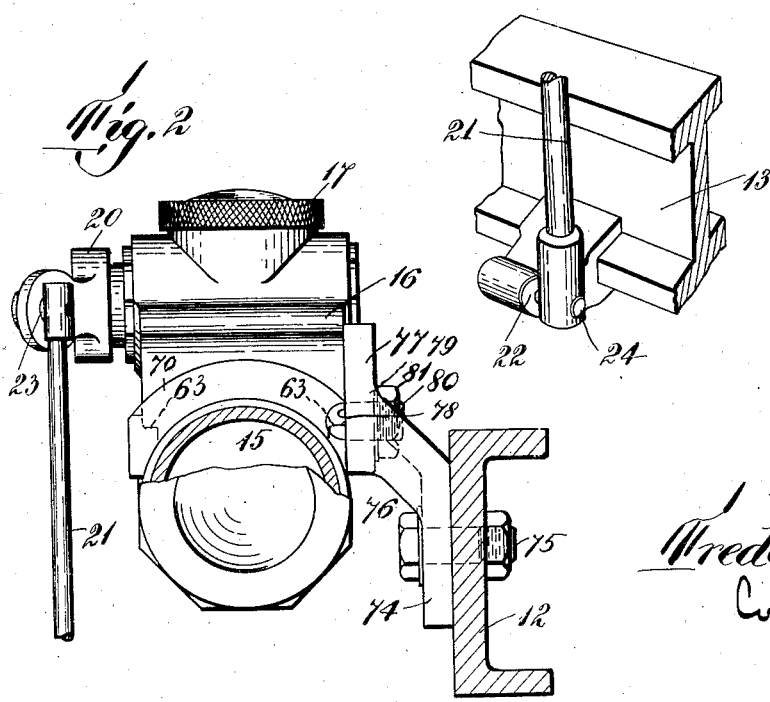
Inventor:
Frederik Nielsen Feb. 14, 1928. 1,659,330
F. NIELSEN
SHOCK ABSORBER
Filed Dec. 24, 1925 2 Sheets-Sheet 2
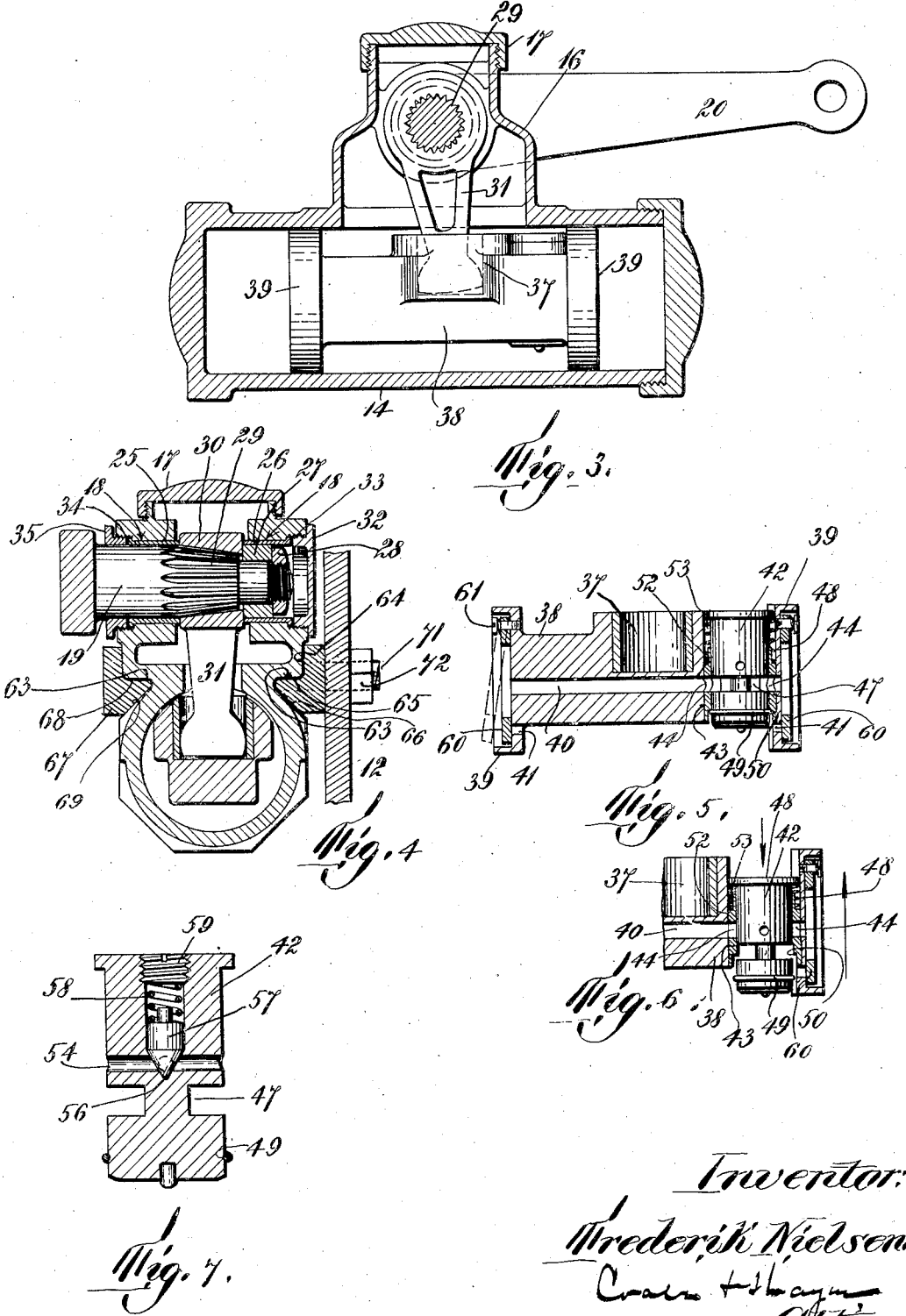

Patented Feb. 14, 1928.

1,659,330

UNITED STATES PATENT OFFICE.

FREDERIK NIELSEN, OF ATLANTIC, MASSACHUSETTS, ASSIGNOR TO JAMES S. LANG, OF BOSTON, MASSACHUSETTS.

SHOCK ABSORBER.

Application filed December 24, 1925. Serial No. 77,597.

This invention is an improvement on that disclosed by my Patent No. 1,016,514, dated February 6, 1912, and has for its chief object to provide certain improvements whereby the useful results attained by the construction disclosed by said patent are attained in a shock absorber which includes a cylinder and a piston reciprocating rectilinearly therein.

Other objects of the invention will appear in the following description.

Of the accompanying drawings forming a part of this specification,—

Figure 1 is a perspective view, showing a portion of the chassis frame of a motor vehicle, a portion, also, of one of the axles, the shock absorber, and clamping means for attaching the latter to the chassis frame.

Figure 2 is an end view of the shock absorber shown by Figure 1, and a modified form of clamping means for attaching it to the chassis frame.

Figure 3 is a longitudinal vertical section of the shock absorber, the piston therein being shown in elevation.

Figure 4 is a cross section of the shock absorber.

Figure 5 is a longitudinal section, showing the piston only, the balanced valve being shown in elevation.

Figure 6 is a view similar to a portion of Figure 5, showing the balanced valve in a different position.

Figure 7 is a sectional view of the balanced valve.

The same reference characters indicate the same parts in all the figures.

In the drawings, 12 represents a portion of one of the longitudinal side bars of a chassis frame, and 13 a portion of one of the axles of the vehicle.

The shock absorber includes a cylinder 14, containing a chamber 15, and having a lateral hollow extension or bonnet 16, between its ends, closed at its outer end by a screw cap 17. The cylinder is secured to the frame portion 12 by clamping means hereinafter described.

Said bonnet is bored at opposite ends to form sockets 18, 18 (Figure 4) receiving portions of a rock shaft 19, adapted to rock in the bonnet. An outer arm 20 fixed to the rock shaft 19 is connected by a rod 21 with a bracket 22 (Figure 1), clamped to the axle 13, the rod being pivoted at 23 to the arm 20, and at 24 to the bracket 22.

The sockets 18 are provided with bushings 25 and 26 (Figure 4). The rock shaft 19 has a larger end portion journaled in the bushing 25, and a smaller end portion projecting into the bushing 26, and provided with a collar 27, which is secured to the rock shaft by a nut 28, engaged with the threaded inner end of the rock shaft, the collar constituting the portion of the rock shaft which turn in the bushing 26.

The intermediate portion of the rock shaft is tapered, and provided with longitudinal teeth 29, which engage a tapered socket in the hub 30 of an inner arm 31. Said inner arm and the outer arm 20 constitute a bell-crank lever. The angularity of said lever may be varied by loosening the nut 28, turning the rock shaft 19 in the hub 30, and tightening the nut. In assembling said arms, the rock shaft 19 is inserted in the sockets 18 of the extension and in the inner arm hub 30, while the nut 28 and a cap 32 closing one of said sockets are removed, then applying the nut 28, and then applying the cap 32. Liquid-tight joints are formed by a packing ring 33, interposed between the cap 32 and the bushing 26, and by a packing ring 34, interposed between the bushing 25 and a gland 35 screwed into one end of the bonnet 16.

The inner arm 31 projects into the cylinder 14, and has an enlarged inner end occupying and movable in a socket 37 (Figures 3 and 5) in the body 38 of a piston which is adapted to reciprocate in the cylinder. The piston is enlarged at its opposite ends to form heads 39, having a close sliding fit in the inner wall of the cylinder.

The piston is provided with a longitudinal flow duct 40, extending through it from end to end. The heads 39 are provided with short flow ducts 41, located outside the body 38. Extending across the duct 40, is a balanced cylindrical valve 42, movable in a tubular vertical guide 43 (Figure 5) fixed in a transverse socket 46 in the piston body, said guide having ports 44 forming parts of the duct 40. The valve 42 has a peripheral groove 47, which is normally held by a helical spring 48, in position to register with the duct 40, and ports 44, as shown by Figure 5. A stop shoulder 49, on the lower portion of the valve, abuts against a shoulder 50 (Figure 5) on the guide 43, to limit the movement of the valve by the spring.

The guide is provided with a shoulder 52, and the valve with a shoulder 53, the spring 48 being interposed between said shoulders. The spring 48 has only sufficient force to support the weight of the valve, which is sufficiently heavy to cause it to remain at rest by its own inertia when the cylinder and piston are suddenly forced upward, the spring yielding and being compressed.

The valve 42 is provided above the peripheral groove 47 with a contracted return duct, or, as here shown, with two intersecting return ducts 54. The inner ends of the return ducts open on an internal seat 56, against which an auxiliary valve 57 is yieldingly pressed by a spring 58 to close said ducts, the valve and seat being preferably conical. The spring 58 is confined by a screw plug or abutment 59.

The heads 39 of the piston are recessed, and in each head is loosely mounted a clapper valve 60, said valves being adapted to open and close the short ducts 41 in the piston heads. The valves 60 are rings, adapted to swing loosely on studs 61, fixed to the piston heads. They do not obstruct the ends of the duct 40, and are adapted to close the ducts 41 alternately, one valve closing on a duct 41, when the piston is moving in one direction, and the other closing on the other duct 41, when the piston is moving in the opposite direction, the valve of the rear end of the piston being closed, and the other valve opened when the piston is in motion.

The operation of the shock absorber mechanism is as follows:

The cylinder contains a charge of liquid such as glycerine. When the vehicle is running on a relatively smooth track, and the up and down movements of the axles are of minimum amplitude, the balanced valve 42 is maintained by the spring 48 in the position shown by Figure 5, the longer flow duct 40 being open from end to end, and the shorter flow ducts 41 being alternately opened and closed. The liquid at the ends of the piston flows freely from end to end of the cylinder, through the duct 40. The liquid between the piston heads 39 flows through one of the shorter ducts 41, when the piston is moving in one direction, and through the other shorter duct, when the piston is moving in the opposite direction. Under these conditions the balanced valve 42 remains in the position shown by Figure 5.

When the vehicle is running on a relatively rough or uneven track and the up and down movements of the axles are of greater amplitude, the balanced valve 42 acts to prevent an upward movement of the chassis frame of corresponding amplitude, because the inertia of the valve retards or checks its upward movement sufficiently to cause the upward movement of the cylinder and piston to change the relative positions of the piston and valve 42, the duct 40 of the piston rising above the groove 47 of the valve, as shown by Figure 6, so that free flow of the liquid through the duct is prevented by the portion of the valve above said groove. A portion of the liquid charge is therefore confined between the advancing head of the piston and the corresponding head of the cylinder. A relatively slow or retarded return movement of this portion of the charge is now permitted by the return ducts 54 and the auxiliary valve 57, the liquid acting to raise the auxiliary valve against the pressure of the spring 58, so that the piston is permitted to slowly and gently complete its stroke. Excessive upward movement of the chassis frame is thus prevented.

I have provided clamping means for securing the cylinder 14 to the chassis frame, said means permitting the attachment of the cylinder to either the right or the left frame bar 12.

The inner portion of the cylinder bonnet is provided at opposite sides with oppositely projecting salient angled shoulders 63, overhanging portions of the cylinder 14, as shown by Figures 2 and 4. 64 represents an inner clamping member, formed as a plate bearing on the frame bar 12, and having faces 65 and 66, forming a reentrant angled jaw contacting with one of the shoulders 63. With the member 64 cooperates an outer clamping member which, as shown by Figures 1 and 4, is a yoke composed of a bar or jaw 67, having faces 68 and 69, and arms 70 formed on opposite ends of the bar and curved to extend across and conform to the upper side of the cylinder at opposite ends of the bonnet 16. The faces 68 and 69 form a reentrant angled jaw contacting with the other shoulder 63. The arms 70 are extended to form bolts 71, passing through holes in the plate 64 and in the frame bar 12, and provided with nuts 72.

In assembling the parts the member 64 is applied to a frame bar 12. One of the shoulders 63 is applied to the member 64, the bar 67 of the yoke is applied to the other shoulder 63, the bolts 71 being at the same time inserted in the member 64 and the frame bar 12, and the nuts 72 are applied to the bolts and turned against the bar 12. The cylinder is thus firmly secured to the frame bar.

In the modification shown by Figure 2, a bracket-shaped member is substituted for the plate-shaped member 64, and includes a base portion 74, attached by bolts 75 to the bar 12, a neck portion 76, and an offset portion 77 having faces 78 and 79, forming a reentrant angled jaw contacting with one of the shoulders 63. The arms 70 are, in this modification, provided with short bolts 80, passing through holes in the offset portion 77 and secured thereto by nuts 81.

The length of the piston 38 is such that it is adapted to define liquid chambers between its opposite ends and the opposite ends of the cylinder 14. The longitudinal axis of the cylinder and piston is substantially horizontal or parallel with the track on which the vehicle is supported. In case of loss of liquid by leakage or evaporation, so that the liquid does not completely fill the said chambers, the liquid level is maintained by the horizontal arrangement at substantially the same height in each chamber when the track is substantially horizontal. When the conditions are as above stated, and the duct 40 is open from end to end of the piston, as shown by Figure 5, the liquid in each chamber offers substantially the same resistance to movement of the piston as the liquid in the opposite chamber, and flows horizontally from chamber to chamber through the duct 40. It will be seen, therefore, that when the conditions do not require the employment of the balanced valve, said valve may be omitted, as shown by Figure 5, so that there will constantly be a continuous duct through the piston. The same result may be secured by fastening the balanced valve in the position shown by Figure 5.

I claim:

1. A shock absorber comprising a cylinder, a piston therein having a flow duct extending through it from end to end and adapted to permit a relatively rapid flow of a cushioning liquid, and a balanced valve normally in position to open said duct, and adapted by inertia to close the duct.

2. A shock absorber comprising a cylinder, a piston therein having a flow duct extending through it from end to end and adapted to permit a relatively rapid flow of a cushioning liquid, and a balanced valve normally in position to open said duct, and adapted by inertia to close the duct, said valve having a contracted return duct and an auxiliary valve normally closing the return duct, and adapted to be opened by returning liquid.

3. A shock absorber comprising a cylinder, a piston in the cylinder, means for reciprocating the piston, said piston having a longitudinal flow duct, and a transverse open guide between the ends of said duct, a balanced valve in said guide, having a flow port adapted to open the duct, a spring normally maintaining the valve in a duct-opening position, the balanced valve being provided with a restricted return duct and with an auxiliary valve normally closing the return duct, the arrangement being such that the relative positions of the piston and the balanced valve may be automatically changed to cause the balanced valve to close the flow port and permit a restricted return flow of liquid through said return duct.

4. A shock absorber substantially as specified by claim 3, the said guide and balanced valve being provided with abutment shoulders between which said spring is interposed, and with complemental stop members limiting the action of the spring.

5. A shock absorber substantially as specified by claim 3, the said piston including a body portion and heads at opposite ends thereof, provided with short ports outside the body portion, said heads being provided with valves adapted to close said ports alternately.

6. A shock absorber comprising a cylinder having a lateral bonnet, a rock shaft journaled in said bonnet, outer and inner lever arms fixed to the rock shaft, a piston in the cylinder provided with a socket engaged with the inner arm, a longitudinal flow duct and a transverse open guide between the ends of said duct, and automatic means associated with said duct and guide for regulating the flow of liquid from end to end of the cylinder.

7. A shock absorber substantially as specified by claim 6, the said rock-shaft being provided with a tapered toothed portion entering a tapered socket in the hub of the said inner arm, and with means for forcing the said hub into engagement with said toothed portion.

8. A shock absorber comprising a cylinder having a bonnet, and angular shoulders in said bonnet, a rock-shaft journaled in said bonnet, outer and inner lever arms fixed to the rock-shaft, a piston in the cylinder provided with an inner arm-receiving socket, a longitudinal flow duct, an inner clamping member, adapted to bear on a chassis frame, and provided with an angular jaw engaging one of said shoulders, and an outer clamping member provided with an angular jaw engaging the other shoulder, means being provided for securing said members to each other and to a frame bar.

9. A shock absorber comprising a cylinder having a bonnet, and angular shoulders in said bonnet, a rock-shaft journaled in said bonnet, outer and inner lever arms fixed to the rock-shaft, a piston in the cylinder provided with an inner arm-receiving socket, a longitudinal flow duct, an inner clamping member, adapted to bear on a chassis frame, and provided with an angular jaw engaging one of said shoulders, an outer clamping member provided with an angular jaw engaging the other shoulder, and with arms extending across portions of the cylinder, and adapted to engage the inner member and the frame bar.

10. A shock absorber comprising a cylinder, a piston therein adapted to form liquid chambers between its opposite ends and the opposite ends of the cylinder, a flow duct arranged to connect said chambers, and an inertia valve controlling said duct.

11. A shock absorber comprising a cylinder, a piston therein adapted to form liquid chambers between its opposite ends and the opposite ends of the cylinder, a flow duct arranged to connect said chambers and extending through the piston from end to end of the latter, and an inertia valve controlling said duct.

12. A shock absorber comprising a substantially horizontal cylinder, a piston therein adapted to form liquid chambers between its opposite ends and the opposite ends of the cylinder, a flow duct arranged to connect said chambers, said piston including a body portion and heads at opposite ends thereof, provided with ports outside the body portion, said heads being provided with valves adapted to close said ports alternately.

FREDERIK NIELSEN.